United States Patent [19]
Woodruff

[11] 3,987,404
[45] Oct. 19, 1976

[54] UNDERWATER DIRECTION FINDING SYSTEM
[75] Inventor: Thomas E. Woodruff, Nashua, N.H.
[73] Assignee: Sanders Associates, Inc., South Nashua, N.H.
[22] Filed: Nov. 3, 1967
[21] Appl. No.: 682,724

[52] U.S. Cl. ............................................. 340/6 R
[51] Int. Cl.² ........................................... G01S 3/80
[58] Field of Search .............. 340/2, 6, 16; 343/120, 343/119

[56] References Cited
UNITED STATES PATENTS

| | | | |
|---|---|---|---|
| 2,754,493 | 7/1956 | Lippel | 340/16 |
| 2,837,730 | 6/1958 | Snyder | 340/16 |
| 2,867,788 | 1/1959 | Harry | 340/6 |
| 3,022,462 | 2/1962 | Keiper, Jr. | 340/2 X |
| 3,148,351 | 9/1964 | Bartlett | 340/6 X |
| 3,160,850 | 12/1964 | Dudley | 340/6 |
| 3,176,262 | 3/1965 | Ehrlich et al. | 340/6 X |

Primary Examiner—Richard A. Farley
Attorney, Agent, or Firm—Louis Etlinger

[57] ABSTRACT

An underwater direction finding system includes a pair of directional hydrophones and a compass in a novel arrangement which associates the signals from all three elements with a single subcarrier. Subsequent demodulation of the subcarrier signals in an airplane or ship then provides directional information directly referenced to the earth's magnetic coordinates.

14 Claims, 3 Drawing Figures

FIG. 1

INVENTOR
THOMAS E. WOODRUFF
BY
ATTORNEY

FIG. 2B

UNDERWATER DIRECTION FINDING SYSTEM

BACKGROUND OF THE INVENTION

This invention is primarily directed to anti-submarine operations in which the sonobuoys are dropped from aircraft to the surface of the ocean and hydrophones suspended from the buoys convert acoustical signals from the submarines to electrical signals. These signals are transmitted from the buoys to the aircraft, where they are processed to locate the submarine, which is then demolished or disabled by means of explosive charges dropped into the water.

Modern submarines, however, are characterized by both high speed and great maneuverability. The sonobuoys must therefore transmit signals which can be quickly processed to accurately locate the targets, so that the latter can be tracked closely enough to bring depth charges or other explosive devices within lethal range. High sensitivity is another requirement in present day systems. For example, where echo ranging is used, with the sonobuoys picking up signals generated by a suitable underwater source and then reflected from the submarine to be tracked, the acoustical signals are often highly attenuated by the time they are picked up, particularly if the system is to be operable over a large area. Also, if a passive system is to be used, with the sonobuoys detecting acoustical energy emanating from the submarine itself, high sensitivity is required because of the relative quietness with which modern submarines are capable of operating.

The cost, size and weight of the sonobuoys is an important factor, especially when they are to be carried by an aircraft, since they are expendable and a large number may be used in a given operation. In prior units the direction of the target has been ascertained by comparing the amplitudes of the electrical outputs of a number of hydrophones disposed in an array of sonobuoys. Accuracy of an arrangement of this type requires both individual calibration of all the hydrophones and extensive precautions against changes in their characteristics. These factors add considerably to the expense of the system, particularly where high accuracy is required.

OBJECTS OF THE INVENTION

A principal object of the invention is to provide a sonobuoy which gives an accurate indication of the direction of a target therefrom.

Another object of the invention is to provide a sonobuoy that is sensitive to the low level signals encountered in searching for modern submarines.

A further object of the invention is to provide a sonobuoy of the above type which is operative over a wide range of acoustical signal levels.

A still further object of the invention to to provide a sonobuoy of the above type whose output signals are readily processed in an airplane or surface vessel to provide the desired target information.

Yet another object of the invention is to provide a sonobuoy of the above type capable of sensing signals at great depths.

Another object of the invention is to provide a sonobuoy of the above type which has a relatively low cost and is small in size and weight and thus highly suitable for transportation and deployment by aircraft.

A further object of the invention is to provide a submarine locating system incorporating sonobuoys of the above type.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

GENERAL DESCRIPTION OF THE INVENTION

In general, a sonobuoy embodying the invention employs an omnidirectional hydrophone, together with a pair of directional hydrophones and a compass transducer which indicates the angular relationship between the axes of the directional hydrophones and the earth's magnetic axis. The hydrophone output signals are processed to indicate the direction of an incoming acoustical signal relative to the hydrophone axes and the signal from the compass transducer is combined with the hydrophone signals to indicate the compass bearing of the source of the acoustical energy.

More specifically, the relative amplitude of a signal picked up by a directional hydrophone depends on its direction of arrival with respect to the axis of the hydrophone. In essence, the system determines this relative amplitude by ascertaining the ratio of the amplitudes of the output signals of two directional hydrophones arranged with their axes perpendicular to each other. This eliminates such factors as signal intensity and hydrophone sensitivity. That is, the ratio is a function only of the direction of the target and is independent of the intensity of the incoming acoustical energy. Accordingly, none of the hydrophones in the system need be calibrated. All that is required is that the two directional hydrophones in each sonobuoy have the same sensitivity or that the ratio of their sensitivities be known. It is a simple matter to equalize sensitivities merely by attenuating the output of the more sensitive hydrophone.

With a bidirectional hydrophone, the type preferably employed by the present invention, there are four possible directions of arrival for any given relative signal amplitude, i.e. one in each quadrant. As will be seen, the signals from the directional hydrophones are compared in phase with the output of the omnidirectional hydrophone to determine which quadrant contains the target.

The system employs a novel arrangement by which the signals from the compass transducer and both directional hydrophones modulate the same subcarrier in a subsurface unit to which these components are attached. This subcarrier and the signal from the omnidirectional transducer are transmitted over the same cable to the surface unit of the sonobuoy and there they modulate the output of a transmitter which sends the signals on to the hovering aircraft.

To preserve the directional information in the hydrophone signals it is only necessary to preserve the ratio of the signal levels from the two directional hydrophones. This is accomplished by modulating the same subcarrier with both signals, using the same form of modulation in both cases. The attenuation of both signals is thus the same from modulation of the subcarrier on through transmission from the sonobuoy, and finally demodulation of the radio frequency signal received by the aircraft. Accordingly, the handling of the signals from the time they leave the hydrophones until they are demodulated effects no change whatsoever in the ratio of their amplitudes. As explained below, the signals from the compass transducer and the omnidirectional hydrophone are used only for phase information, and, consequently, there is no need to preserve their relative amplitudes. At the frequencies used, preservation of relative phase is no problem.

With the foregoing arrangement each sonobuoy provides signals accurately fixing the direction of the target therefrom. Also, no mechanical rotation of the hydrophones, as required by some prior systems, is necessary when the present invention is employed. Thus, the sonobuoys can readily be used in pulsed echolocation modes of operation. Specifically, the hydrophone rotating systems obtain directional information by ascertaining the angular positions of the rotating hydrophones corresponding to maximum or minimum detected signals from the targets. An arrangement of that nature is effective only if there is a substantially continuous signal from the target, a condition which does not occur with pulse type echolocation, wherein acoustical pulses generated by a suitable underwater source and reflected from the target are used in locating the target.

In any case, the efficacy of the invention is undiminished if the hydrophones do rotate, a condition which might occur as a result of ocean currents or the twisting or untwisting of the cable by which the transducers are suspended. This is because the directional hydrophone signals are eventually modified by the output of the compass transducer, which rotates with the hydrophones, to provide a target bearing related to the magnetic reference rather than the axes of the directional hydrophones.

The foregoing features of the invention are accomplished in a relatively small, low-cost unit. Each sonobuoy requires but three hydrophones to provide accurate bearing information. The signals from the directional hydrophones and the compass transducer modulate only a single subcarrier and a single amplifier suffices to amplify both the modulated subcarrier and the omnidirectional hydrophone signal for transmission from the underwater unit to the surface section of the sonobuoy by way of a single pair of conductors.

In the receiver, the incoming subcarrier signal is demodulated in a novel circuit that translates the directional hydrophone signals to compass coordinates. These signals may then be analyzed on a frequency-by-frequency basis to ascertain the bearings of the sources of the individual frequency conponents of the incoming acoustical signals at the sonobuoy. This type of analysis is often important because of the different acoustical spectro characteristic of different signal sources such as submarines, surface vessels and marine life.

DETAILED DESCRIPTION OF THE INVENTION

The Sonobuoy

Figure 1:
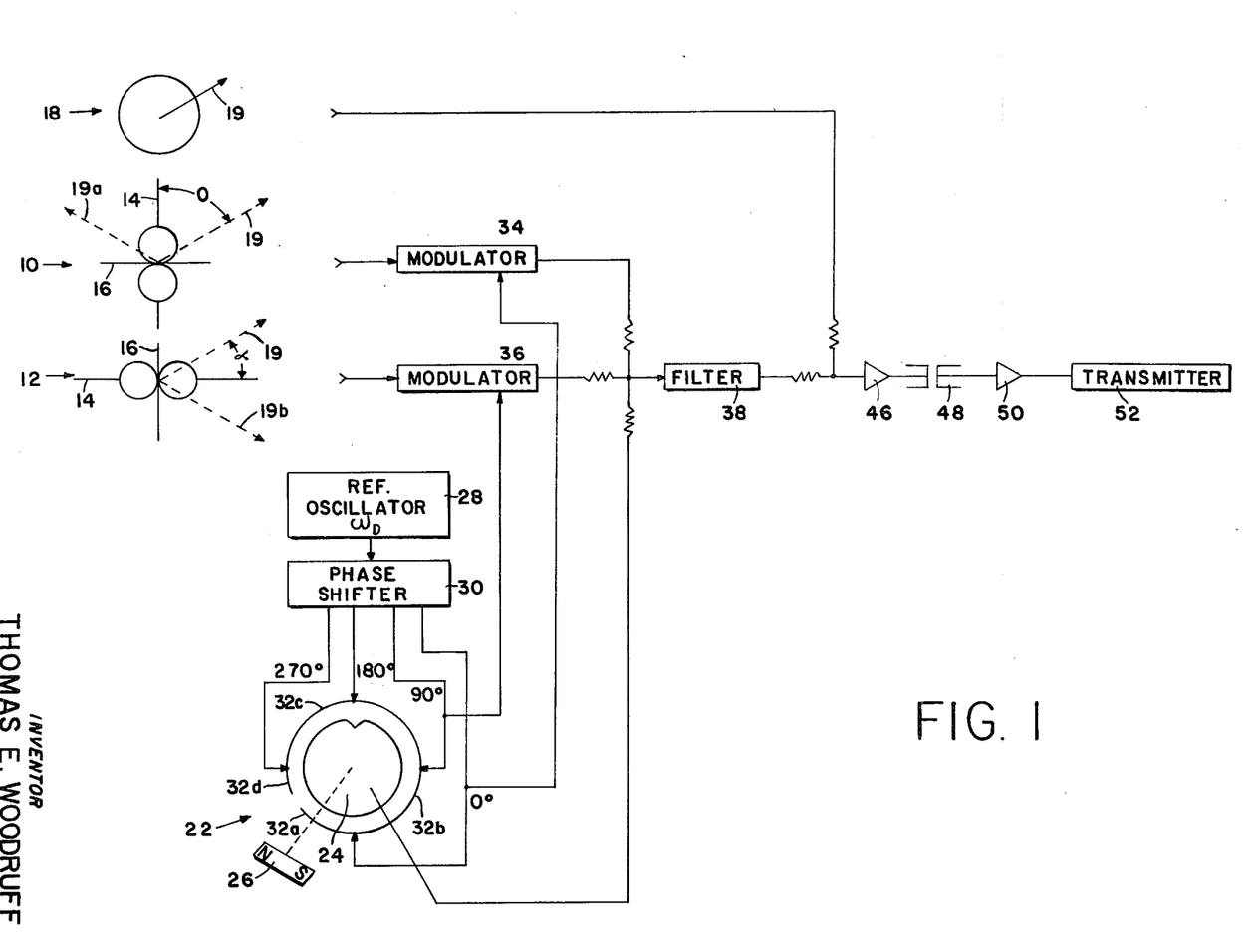
FIG. 1 is a schematic diagram of a sonobuoy incorporating the invention.

As shown in FIG. 1, a sonobuoy embodying the invention carries a pair of bidirectional electro-acoustical transducers or hydrophones 10 and 12 suspended below the surface of the water to convert incoming acoustical signals into corresponding electrical signals. These transducers, which are schematically shown in FIG. 1, are characterized by the azimuthal directivity patterns shown in the drawing. Thus, they have sensitive axes 14 of maximum response to incoming energy and null axes 16 of minimum response. They are affixed to a supporting structure (not shown) with their sensitive axes preferably orthogonal to each other.

The output voltage $e_{10}$ of the transducer 10 is related to the various relevant parameters by $$e_{10} = Sf(t) \cos \theta \tag{1}$$

Where $\theta$ is the angle from the sensitive axis 14 of the transducer 10 to the direction of arrival of the incoming energy (arrow 19);

$f(t)$ represents the incoming pressure wave as a function of time; and $S$ is the transfer function of the transducer, i.e. its sensitivity.

Similarly, the output voltage $e_{12}$ of the transducer 12 is given by $$e_{12} = Sf(t) \cos \alpha \tag{2}$$

Where $\alpha$ is the angle from the sensitive axis 14 of the transducer 12 to the direction of the incoming acoustical wave.

Since $\cos \alpha = \sin \theta$, equation (2) can be rewritten as $$e_{12} = Sf(t) \sin \theta \tag{2A}$$

Assuming that the transducers 10 and 12 have equal sensitivities, $$\frac{e_{12}}{e_{10}} = \frac{\sin \theta}{\cos \theta} = \tan \theta \tag{3}$$

Thus, by calculating the ratio $e_{12}/e_{10}$, one may readily ascertain the angle $\theta$ independently of the characteristics of the acoustical signal and furthermore independently of the characteristics of the transducers 10 and 12, assuming as noted above that the transducers have equal sensitivities. If the sensitivities of the transducers are unequal but related by a known ratio, then the ratio $e_{12}/e_{10}$ may be modified correspondingly to arrive at $\tan \theta$.

Calculation of the absolute value of $\tan \theta$ in the above manner does not in itself determine unambiguously the direction of the source of the acoustical signal. For each absolute value of $\tan \theta$ there are four possible directions, one in each of the quadrants defined by the axes 14 and 16 of FIG. 1. This quadrant ambiguity is resolved by means of phase comparisons.

The phase of the output signal of each of the bidirectional transducers 10 and 12 depends on the direction of arrival of the acoustical input signal. In particular, a signal arriving from one side of the null axis 16 will have a phase opposite to that of a signal arriving on the other side of the null axis. On the other hand, an omnidirectional transducer 18 suspended along with the transducers 10 and 12 provides an output signal whose phase is independent of the direction of the input signal. By comparing the phase of the signal from the omnidirectional transducer with the phases of the outputs of the directional transducers 10 and 12, the system ascertains for each directional transducer the side of the null axis 16 thereof on which the incoming signal is arriving. These two phase comparisons provide the required quadrant information.

More specifically, assume for example that the incoming acoustical signal arrives from the direction indicated by the arrow 19. A comparison of the phases of the outputs of the transducers 10 and 18 provides the information that the direction of arrival is on the upper side (FIG. 1) of the null axis 16 of the transducer 10, i.e. corresponding to the arrow 19 in the first quadrant or the arrow 19a in the second quadrant. A similar comparison involving the transducer 12 provides the information that the direction of arrival is on the right-hand side of the null axis 16 thereof, i.e. corresponding to the arrow 19 or the arrow 19b in the fourth quadrant. Together the two comparisons indicate that the signal source must be in the first quadrant and therefore in the direction of the arrow 19, whose exact angular relationship with the transducer axes is ascertained in the manner described above.

Conventional phase detectors can make the two phase comparisons and simple logic circuits can process the outputs of the phase detectors to provide the desired quadrant information.

The earth's magnetic reference is introduced into the system by a compass transducer generally indicated at 22. In essence, the transducer 22 is a resolver whose rotor 24 is mounted on the same shaft as a magnet 26. An oscillator 28 and a phase shifter 30 provide four signals in successive quadrature relationship, which are applied to stator elements 32a–32d. The illustrated resolver is a capacitive-type unit in which the stator elements are plates disposed concentrically with the rotor 24 and the output signal of the transducer is taken from the rotor. The rotor is a summing point for voltages induced therein by proximity to the stator elements 32a–32d.

If the induced voltages were all equal, the net voltage on the rotor would be zero by virtue of the phase symmetry of the excitation voltages applied to the stator elements 32a–32d. However, with the illustrated rotor configuration, the effective distance between the rotor and at least one of these stator elements is different from the distance to other stator elements, resulting in a net output voltage whose phase depends on the angular position of the rotor. For example, in the illustrated position, the capacitances between the rotor 24 and the stator elements 32b and 32d are equal, so that no net voltage is induced in the rotor by the excitation signals applied to these elements. There is, however, a difference in capacitance between the rotor and the elements 32a and 32c, such that the coupling to the element 32a is greater. The output signal of the transducer 22 thus has a zero phase angle. With the rotor 24 rotating with the magnet 26 and the stator elements 32 mechanically fixed to the bidirectional transducers 10 and 12 so as to rotate therewith, the compass transducer 22 therefore provides an output signal indicative of the orientation of the axes of the transducers 10 and 12 with respect to the magnetic reference. Specifically, the output voltage of $e_{22}$ of the compass transducer is related to the angle $\phi$ between magnetic north and the axis 14 of the bidirectional transducer 10 by $$e_{22} = \cos(\omega_D t + \phi) \tag{4}$$

The compass bearing $\psi$ of the incoming signal is the difference between the angles $\theta$ and $\phi$.

The electrical arrangement of the various components of the sonobuoy is illustrated in FIG. 1. The outputs of the bidirectional transducers 10 and 12 are applied to suppressed carrier modulators 34 and 36 to modulate subcarriers provided by the oscillator 28 and phase shifter 30. As indicated in the drawing these signals are in quadrature with each other. Accordingly, the modulator 34 has an output with the form $$f(t) \cos \theta \cos(\omega_D t) \tag{5}$$

and the output of the modulator 36 has the form $$f(t) \sin \theta \cos(\omega_D t + \pi/2) = f(t) \sin \theta \sin \omega_D t \tag{6}$$

The signals from the modulators 34 and 36 are summed with the output of the transducer 22 at the input of a band pass filter 38.

Summation of the directional transducer signals provides a resultant whose phase angle has the tangent: sin $\theta$/cos $\theta$; the signal applied to the filter 38 can therefore be represented by $$f(t) \cos(\omega_D t + \theta) + \cos(\omega_D t + \phi) \tag{7}$$

Accordingly, the directional information is now contained in the relative phases of the two components of this signal.

The output of the omnidirectional transducer 18 is summed with the output of the filter 38 at the input of an amplifier 46. The output of the amplifier 46 is passed up to the surface unit of the sonobuoy by means of a cable indicated at 48. It is then amplified by an amplifier 50 and transmitted to the aircraft by a transmitter 52 whose high frequency output is modulated by the signals from the subsurface portion of the sonobuoy.

The Receiver

Figure 2A:
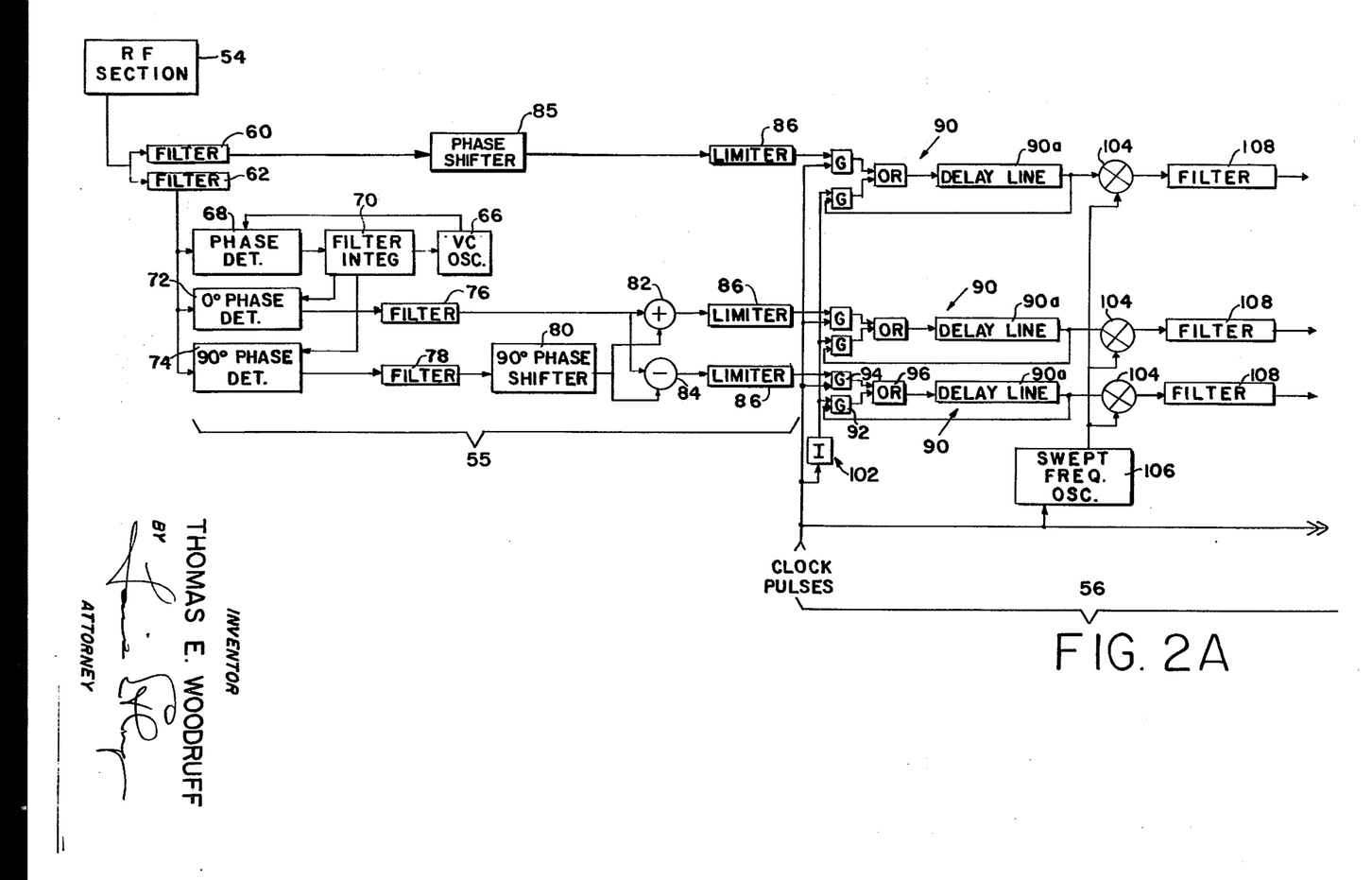
FIGS. 2A and 2B taken together form a schematic diagram of a receiver used to process the signals from the sonobuoy of FIG. 1.
Figure 2B:
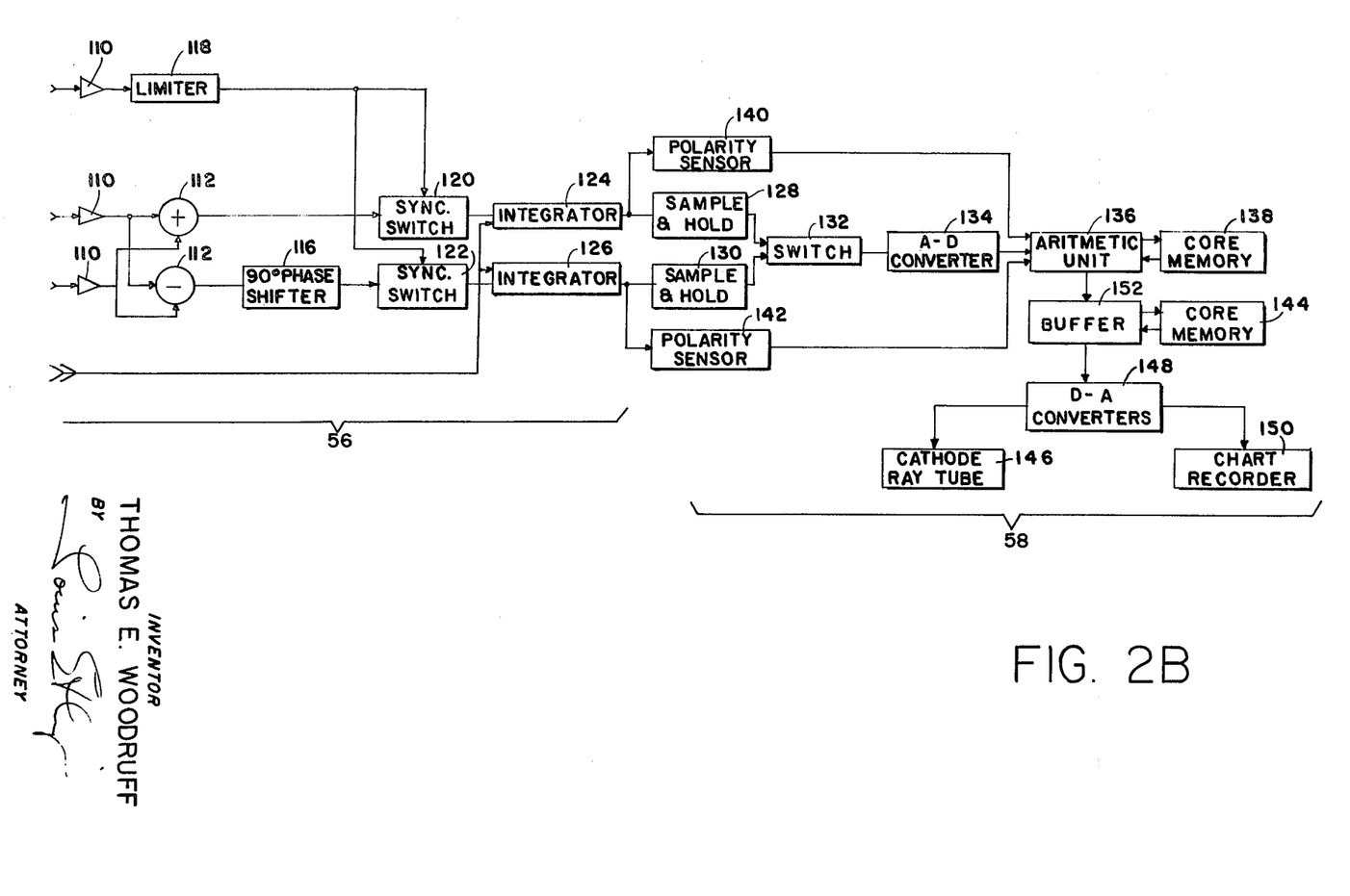

FIGS. 2A and 2B taken together illustrate the preferred configuration of the receiver incorporated in the system. This unit includes a radio frequency section 54 followed in turn by a demodulator 55, a frequency scanning section 56 and a storage and computing section 58. The radio frequency section 54 demodulates the incoming signals from the radio frequency carrier. The demodulator demodulates the directional transducer and compass transducer signals from the subcarrier $\omega_D$. The frequency scanning section 56 ascertains the frequency components in the acoustical signals received by the hydrophones at the buoy and the storage and computing section 58 processes the output of the section 56 to ascertain the compass bearings of the respective frequency components.

The output of the radio frequency section 54 is applied to a low-pass filter 60 and a high-pass filter 62 to separate the output of the omnidirectional transducer 18 (FIG. 1) from the modulated subcarrier containing the compass and directional transducer signals. The modulated subcarrier is passed by the filter 62 to the demodulator 55 whose outputs correspond to the acoustical signals developed by the directional transducers at the sonobuoy.

The demodulator 55 includes a voltage controlled reference oscillator 66 connected in a phase lock loop to provide an output having the angular frequency $\omega_D$ and the phase $\phi$ of the output of the compass transducer 22. Specifically, the outputs of the oscillator 66 and the filter 62 are applied to a phase detector 68. The output of the phase detector 68 in turn is passed through a low-pass filter and integrator 70 to serve as a frequency control signal for the oscillator 66.

The compass transducer signal is modulated by rotation of the sonobuoy and the unit suspended therefrom. However, this occurs at a much lower rate than the frequencies of the acoustical signals received by the hydrophones. The low-pass filter 70 is set to exclude the acoustical signals from the control signal applied to the oscillator 66, and therefore the phase of the oscillator is locked to that of the incoming compass transducer signal.

The acoustical signals from the hydrophone transducers are demodulated in synchronous detectors 72 and 74 controlled by the reference oscillator 66. The oscillator output includes a signal in phase with the compass transducer signal and a quadrature component developed by an internal phase shifter. The inphase component is applied to the detector 72 and the quadrature component to the detector 74. Accordingly, the output of the detector 72, which is proportional to the cosine of the difference in phase between the input from the oscillator 66 and the signal input from the hydrophones, has the form $$f(t) \cos(\theta - \phi) = f(t) \cos \psi \qquad (8)$$

Similarly, the output of the detector 74 has the form $$f(t) \sin \psi \qquad (9)$$

Expressions (8) and (9) have the same form as expressions (1) and (2A). The outputs of the demodulator 55 are therefore reconstructions of the directional hydrophone signals, modified to reflect the compass bearing of the acoustical input.

It will be helpful at this point to keep in mind that the signal $f(t)$ can be broken down into its Fourier components in accordance with $$f(t) = \Sigma A_n \cos \omega_n t \qquad (10)$$

The signals from the detectors 72 and 74 pass through low-pass filters 76 and 78, the output of the filter 78 being applied to a wide-band phase shifter 80 that shifts all the frequency components of interest by 90°. The signals from the filter 76 and phase shifter 80 are then summed in a summing circuit 82 and subtracted, as shown, in a difference circuit 84. The outputs of the circuits 82 and 84, being the resultants of the inputs to these circuits, have the form $$\Sigma A_n \cos(\omega_n t - \psi_n) \qquad (11)$$

and $$\Sigma A_n \cos(\omega_n t + \psi_n) \qquad (12)$$

respectively. At this point the directional information is again contained in the phase angle of the signal, and therefore the signal amplitudes can be distorted in the following section of the receiver, as described below, without losing this information.

The omnidirectional signal from the filter 60 is passed through a phase shifter 85 that delays this signal for a period of time commensurate with the delays imposed on the directional signals by the demodulator 55.

The signals from the summing and difference circuits 82 and 84 and the phase shifter 85 are applied to limiters 86 which "hard limit" the signals, i.e. convert them to square waves without shifting their zero axis crossings.

The frequency scanning section 56 includes a conventional time compression arrangement that, in essence, stores the incoming signals for a period of time sufficient to examine them on a frequency-by-frequency basis. The section 56 includes a recirculating memory 90 in each channel. Each memory 90 preferably comprises a magnetostrictive delay line with appropriate circuits for feeding the output of the delay line back to the input thereof. The feedback path in each memory includes a gate 92 followed by an OR circuit 96. A second input for the OR circuit 96 is provided by a gate 94 that derives its input from a limiter 86. Each bit in the memory indicates, in binary form, the polarity of the limiter output at the instant the bit was entered into the memory.

The information contained in each memory is updated by entering one bit therein approximately once each time the memory circulates. The system accomplishes this by inserting new samples into the memory at a rate slightly different from the circulation time, so that each new bit will be inserted at a different position from the preceding one. In the illustrated arrangement the new samples are inserted at the rate $$\frac{N}{T(N+1)}$$

where N is the capacity of the memory and T the recirculating time. Accordingly, each new sample is inserted just one positon in the memory following the position of the preceding inserted sample. The recirculating rate, 1/T, is greater than the highest frequency of the incoming signal and therefore the successive bits inserted into the memory provide a suitably faithful reproduction of the signal. Moreover, the capacity N is great enough to accommodate substantially more than a cycle at the lowest frequency.

Accordingly, each memory 90 contains a moving picture of the incoming signal in each channel, with the time being compressed by the factor N and the signal frequencies being multiplied by the same factor. The entire content of the memory changes once in each interval NT.

Updating of the contents of each memory is controlled by a clock signal applied to the gates 92 and 94, the signal to the gates 92 being passed through an inverter 102. Thus, the gates 92 are enabled, to circulate the contents of the memory, except when the clock pulses enable each gate 94 to enter into a memory a new bit of information replacing a single bit previously stored therein. For operation in this manner, the clock pulse rate will be $$\frac{N}{T(N-1)}$$

pulses per second.

The outputs of the memories 90 are applied to mixers 104 which heterodyne these signals with the signal from a sweep oscillator 106. The outputs of the mixers 104 are passed through narrow band filters 108 to amplifiers 110. The frequency of the oscillator 106 advances in steps, with the oscillator remaining at each frequency for one circulation of the memories 90. Thus, during each frequency step, the outputs of the filters 108 contain essentially a single frequency component from the signals circulating in the respective memories 90. A fairly large number of components may thus be separately analyzed by the system during each sweep of the oscillator 106. Assuming that the oscillator repeats its stepwise sweep once for each N circulations of the memories 90, each frequency component will be analyzed once for each consecutive time interval of the incoming signal.

Because of the frequency multiplication resulting from time compression, the frequencies of the oscillator 106 and filters 108 are substantially higher than the frequencies of the incoming acoustical signals. Accordingly, very narrow acoustical bandwidths, e.g. 0.5Hz, correspond to much wider bandwidths in the filters 108. Hence, the absolute bandwidths of the filters are broad enough for rapid response to the signals from the mixers 104.

The outputs of the amplifiers 110 in the directional channels are applied to sum and difference circuits 112 and 114. Since relative phase is preserved between the limiters 86 and the circuits 112 and 114, the output of the summing circuit can be expressed as $$A_n \cos \omega_n t \cos \psi_n \tag{13}$$

and the output of the difference circuit can be expressed as $$A_n \sin \omega_n t \sin \psi_n \tag{14}$$

The latter signal undergoes a 90° phase shift in a phase shifter 116, whose output can therefore be expressed as $$A_n \cos \omega_n t \sin \psi_n \tag{15}$$

Expressions (13) and (15) have the same form as expressions (8) and (9) describing the outputs of the demodulator 55, and expressions (1) and (2A) describing the outputs of the directional transducers 10 and 12.

Similarly, the signal from the amplifier 110 in the omnidirectional channel has the same form as the output of the omnidirectional transducer 18. This signal, after squaring by a hard limiter 118, controls synchronous rectifiers 120 and 122 in the directional channels. The polarities of the rectifier outputs thus indicate in-phase or opposite phase relationships between the directional transducer signals and the omnidirectional transducer signal. As noted above, this information determines the azimuthal quadrant in which the signal source is located.

Gated integrators 124 and 126 integrate the outputs of the rectifiers 120 and 122. The integrators are reset by the same clock pulse that indexes the sweep oscillator 106 and enters a new bit into the memories 90 each time the memories complete a circulation. Thus, each integrator accumulates the memory content of one acoustical frequency component. It then accumulates the next frequency component resulting from the following step of the sweep oscillator 106. Each time it repeats accumulation of a given frequency component, the information stored in the corresponding memory 90 has undergone a complete change. Therefore, successive integrations of each frequency component cover successive time intervals of the incoming acoustical signal. The integrator contents can be represented mathematically by $$A_n \sin \psi_n \tag{16}$$

and $$A_n \cos \omega_n \tag{17}$$

Each time the integrators 124 and 126 are reset, their contents are transferred to sample and hold circuits 128 and 130, where they are held while the integrators integrate the next frequency component. During this interval a switch 132 alternately passes the contents of the hold circuits to an analog-to-digital converter 134. The digital signals from the converter 134 are fed to an arithmetic unit 136 coupled to a digital memory 138.

In the memory 138, each address corresponds with a particular frequency component from the sine or cosine signal channel. The system is programmed to transfer the content of each memory address to the arithmetic unit 136 whenever the corresponding component is arriving from the converter 134. The arithmetic unit adds the two numbers and the sum is then transferred back to that address in the memory 138. In this manner the memory 138 accumulates each frequency component of the sine and cosine signals over a predetermined length of time, the content of the memory being in essence an average over that interval. Each address in the memory 138 also contains the polarity information from the rectifiers 120 and 122, as determined by polarity sensors 140 and 142.

The accumulated values in the memory 138 are transferred to another memory 144 via the arithmetic unit 136 and a buffer 152 that holds them for angle determination. In the illustrated system this is accomplished by passing the stored sine and cosine components (expressions (16) and (17) above) to the vertical and horizontal deflection circuits, respectively, of a cathode ray tube 146. Digital-to-analog converters 148 convert the signals to the requisite analog form.

The slope of the cathode ray tube deflection is $$\frac{\sin \psi_n}{\cos \psi_n} = \tan \psi_n \tag{18}$$

Accordingly, a line from the center of the cathode ray tube to the point determined by the deflection signals will have the same direction as the azimuthal bearing of the acoustical signal source from the sonobuoy.

Additionally, the signals from the digital-to-analog converters 148 may be applied to an x–y chart recorder 150 to provide a more permanent record of the bearings of the various acoustical signal components received at the sonobuoy.

In an alternative arrangement, the contents of the sample and hold circuits 128 and 130 may be applied simultaneously to the analog-to-digital converter 134 with one of the signals serving as a reference for the converter. In that case the output of the converter will be the ratio of the two signals, i.e. tan $\psi_n$. The memory 144 might then function as a translator between the tangents and the corresponding angles. That is, the addresses in the memory will be the tangents developed by the analog-to-digital converter 134, as accumulated in the memory 138. The contents of the respective addresses in the memory 144 will be the angles corresponding with these tangents. Accordingly, each time the memory 144 is addressed in accordance with the content of an address in the memory 138, it will read out the bearing for the frequency components corresponding with the memory 138 address. It will be apparent that one may vary the system in a number of ways without departing from the scope of the invention. For example, while the sensitive axes of the two directional hydrophones 10 and 12 are preferably perpendicular to each other, it is not necessary that one maintain this angular relationship; other predetermined angles might be used. However, this will add substantial complexity to the circuits. Also, the compass transducer 22 is merely illustrative of various bearing transducers which can be used to relate the axes of the directional hydrophones to an external fixed coordinate system.

Indeed, if the directional transducers are employed in a fixed installation instead of in sonobuoys, a bearing transducer will not be necessary. Similarly, in a fixed installation in which the bearings of the sources of accoustical signals always lie within one quadrant, there will be no quadrant ambiguity and the omnidirectional transducer 18 can then be omitted from the system.

However, for use with sonobuoys the arrangement described above provides maximum information with minimum circuit complexity. This is accomplished in the first instance by modulating quadrature components of the same subcarrier with the signals from the two bidirectional hydrophones. The two modulated components are then summed together without losing the information contained in the output signals of the individual hydrophones. Similarly, the compass transducer modulates the same subcarrier; again, in the system described, this signal is summed with the directional transducer modulation signals and the combined output is passed up to the surface unit of the sonobuoy and then transmitted to the receiver without degradation of the bearing information.

The directional information is then recovered from the subcarrier by means of a phase detector and here again the system is simplified by using as a reference signal in the phase detector the subcarrier component coming from the compass transducer. This not only provides an output referenced to the desired external coordinate system, it also does away with the requirement for transmission of the subcarrier itself as a phase reference. That is, only the modulation components need be transmitted, thereby minimizing the power requirement in the system, or, conversely, providing an improved signal-to-noise ratio for a given power output.

Nor is it always necessary to derive bearing information for each of a large number of spectral components in the hydrophone signals. When this is not needed, the output of the demodulator 55 in the receiver may be applied directly to the storage and computing section 58. However, because of the different frequency spectra of the various acoustical sources whose signals are picked up by the system, frequency scanning is generally invaluable in obtaining accurate bearing information for the respective sources. In this case accuracy is optimized by converting the amplitude-related outputs of the demodulator 55 to phase-related signals that are separated according to frequency in the scanning section 56. The signals are then reconverted to amplitude-related signals for computation as described above.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:
1. A direction-finding system for ascertaining the bearings of the sources of underwater acoustical signals, said system comprising
   A. a pair of bidirectional electro-acoustical transducers
      1. each of which has a response to incoming acoustical energy that is a cosine function of the bearing of the source of said energy relative to the sensitive axis of the transducer, and
      2. having their sensitive axes perpendicular to each other,
   B. a reference signal source,
   C. means modulating quadrature-related signals from said reference source with the respective outputs of said transducers and summing the modulated signals to provide a resultant whose phase angle relative to the phase of said source is essentially equal to the bearing of said incoming energy relative to the sensitive axis of one of said bidirectional transducers,
   D. a transmitter connected to effect a wireless transmission of the modulated subcarrier, and
   E. a receiver arranged to receive the signals from said transmitter, said receiver including
      1. means for reconstituting the modulated subcarrier from the signal transmitted by said transmitter,
      2. a pair of phase detectors
         a. connected to demodulate said modulated signals, and
         b. using as reference quadrature-related signals derived from said reference signal, thereby providing a pair of amplitude-related signals whose amplitude ratio is the tangent of said bearing,
      3. frequency separating means for separating the signals from said phase detectors into various frequency components, and
      4. means for determining the bearings for the respective components.
2. The system defined in claim 1 including

A. a bearing transducer connected to provide the output
  1. having the frequency of said reference signal source, and
  2. a phase angle relative to the phase of said source essentially equal to the angle between the sensitive axis of one of said bidirectional transducers and a direction in a fixed coordinate system, and
B. including means for applying
  1. the output of said bearing transducer, and
  2. a signal having a quadrature relationship to said output, to said phase detectors as the reference signals thereof, whereby the amplitude ratio of the phase detector outputs is the tangent of the bearing of said incoming energy in said fixed coordinate system.

3. The system defined in claim 2 in which said frequency-separating means includes
A. means for converting said amplitude-related signals from said phase detectors to phase-related signals,
B. frequency-scanning means connected to provide in succession output signals corresponding to the respective frequency components in said phase-related signals,
C. time-compression means connected to operate on said phase-related signals so that said frequency-scanning means provides outputs that are substantially continuous reproductions of the respective frequency components, and
D. means for reconverting said frequency components to amplitude-related signals.

4. The system defined in claim 3 including output means responsive to the amplitude ratios of the respective frequency components.

5. A direction-finding system for ascertaining the bearings of the sources of underwater acoustical signals, said system comprising
A. a pair of directional transducers for converting said acoustical signal into electrical signals,
  1. each of which has a response that varies as a function of the angle between a sensitive axis thereof and the direction of incoming acoustical energy,
  2. whose sensitive axes are oriented at a predetermined angle with respect to each other,
B. means for converting the relative amplitude of the outputs of said transducers to relative phases of phase-related signals,
C. means for processing the phase-related signals while preserving their relative phases,
D. frequency separating means for separating said phase-related signals according to the various frequency components thereof,
E. means for ascertaining said phase difference for each of said frequency components, and
F. means for determining the bearing for the respective components, said bearing means being
  1. responsive to the phase-related signals, and
  2. arranged to provide an output indication of the bearing of said incoming energy corresponding to said phase difference.

6. The system defined in claim 5 in which said bearing determining means is arranged to
A. convert said phase-related components to a pair of amplitude-related components whose amplitude ratio corresponds to the bearing of said incoming energy, and
B. determines said amplitude ratio, thereby to provide an indicator of said bearing of each of said components.

7. The system defined in claim 5 in which said bearing determining means includes
A. a displace device of the type that deflects a visible indicator in two non-parallel directions according to the respective amplitude of a pair of input components and
B. is arranged to
  1. convert said phase-related components to a pair of signals whose amplitude ratio corresponds to the bearing of said input energy, and
  2. apply the latter signals as said input signals for said display device, thereby to provide a visual display of said bearing for each of said components.

8. The system defined in claim 5
A. including an electro-acoustical transducer providing an output signal whose phase is independent of the bearing of said input energy,
B. in which the phase of the output of each of said directional-transducers depends on the direction of the component of the bearing of said incoming energy along the sensitive axis of the transducer, and
C. in which said bearing determining means includes means for comparing the phase of the output of said omni-directional transducer with the phases of said amplitude-related components, thereby to resolve ambiguities involving the sector of said bearing.

9. A direction-finding system for ascertaining the bearings of the sources of underwater acoustical signals, said system comprising
A. a pair of bidirectional electro-acoustical transducers
  1. each of which has a response to incoming acoustical energy that is a cosine function of the bearing of the source of said energy relative to the sensitive axis of the transducer, and
  2. having their sensitive axes perpendicular to each other,
B. a reference signal source generating a subcarrier,
C. means modulating quadrature-related signals from said reference source with the respective outputs of said transducers and summing the modulated signals to provide a resultant whose phase angle relative to the phase of said source is essentially equal to the bearing of said incoming energy relative to the sensitive axis of one of said bidirectional transducers,
D. means for demodulating said resultant and providing a pair of phase-related signals whose phase difference is essentially equal to said bearing,
E. means for separating said phase-related signals according to the frequency components thereof, and
F. means for determining the bearings for the respective components.

10. The system defined in claim 9 in which said means for demodulating said resultant signal includes a pair of phase detectors
  1. connected to demodulate said resultant signal,
  2. using as references quadrature-related signals derived from said reference signal source, thereby providing a pair of amplitude-related signals whose amplitude ratio is the tangent of said bearing, and 3. means for converting said amplitude-related signals to a pair of phase-related signals whose phase difference is essentially equal to said bearing.

11. The system defined in claim 10
A. including a bearing transducer connected to provide an output
  1. having the frequency of said reference signal source, and
  2. a phase angle relative to the phase of said source essentially equal to the angle between the sensitive axis of one of said bidirectional transducers and a direction in a fixed coordinate system, and
B. including means for applying
  1. the output of said bearing transducer, and
  2. a signal having a quadrature relationship to said output, to said phase detectors as the reference signals thereof, whereby the amplitude ratio of the phase detector outputs is the tangent of the bearing of said incoming energy in said fixed coordinate system.

12. The system defined in claim 10 including

A. an omni-directional electro-acoustical transducer providing an electrical output whose phase is independent of the bearing of said incoming energy, and
B. means for comparing the phase of said omni-directional transducer output with the signals from said phase detector, thereby to determine the quadrant of said bearing.

13. The system defined in claim 9 in which said bearing determining means includes
A. means for reconverting each of said components to amplitude-related signals whose amplitude is the tangent of said bearing, and
B. output means separately responsive to said ratio for each of said components.

14. The system defined in claim 10 including time compression means connected to operate on said phase-related signals prior to said separating means, thereby to provide continuous bearing information for all of said frequency component.

* * * * *